United States Patent
Hecht et al.

(10) Patent No.: US 11,062,319 B1
(45) Date of Patent: Jul. 13, 2021

(54) SYSTEMS AND METHODS FOR FUNDS TRANSFERS VIA A TOKEN MANAGEMENT SYSTEM

(71) Applicant: Wells Fargo Bank, N.A., San Francisco, CA (US)

(72) Inventors: Alan W. Hecht, Chanhassen, MN (US); Azita Asefi, Vacaville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 801 days.

(21) Appl. No.: 15/391,506

(22) Filed: Dec. 27, 2016

Related U.S. Application Data (63) Continuation of application No. 15/344,089, filed on Nov. 4, 2016.

(60) Provisional application No. 62/252,049, filed on Nov. 6, 2015.

(51) Int. Cl.
*G06Q 40/00* (2012.01)
*G06Q 20/40* (2012.01)
*G06Q 20/32* (2012.01)

(52) U.S. Cl.
CPC ....... *G06Q 20/405* (2013.01); *G06Q 20/3226* (2013.01)

(58) Field of Classification Search
USPC ......... 705/39, 37, 36, 26, 44, 26.1, 14, 26.4, 705/27.1; 235/375, 380, 379, 383; 340/540; 719/328, 315; 717/108; 709/226, 227; 715/704; 726/9
See application file for complete search history.

(56) References Cited

U.S. PATENT DOCUMENTS

| | | | |
|---|---|---|---|
| 6,993,658 B1 | 1/2006 | Engberg et al. | |
| 7,249,099 B2 * | 7/2007 | Ling | G06Q 20/04 705/41 |
| 7,827,101 B2 * | 11/2010 | Mascavage, III | G06Q 20/102 705/39 |
| 8,682,802 B1 * | 3/2014 | Kannanari | G06Q 20/367 705/65 |
| 8,812,402 B2 * | 8/2014 | Evans | G07F 17/42 705/66 |

(Continued)

OTHER PUBLICATIONS

"Multiple Locations/Accounts for ACH payments now available", blog.123landlord.com, image capture Aug. 19, 2015 via Wayback Machine (Year: 2015) (Year: 2015).*

(Continued)

*Primary Examiner* — Tien C Nguyen
(74) *Attorney, Agent, or Firm* — Foley & Lardner LLP (57) ABSTRACT

Systems, methods, and apparatuses provide token management in a federated fund transfer environment. An example method includes receiving, by a token management system, a designation of a single token; receiving, by the token management system, a token management designation adapted to manage the single token; receiving, by the token management system, a rule designation for the token to enable association of the single token with two or more entities of the federated fund transfer system; and generating, by the token management system, a rule based on the rule designation to cause application of the rule with the single token in a subsequent fund transfer transaction utilizing the single token.

20 Claims, 6 Drawing Sheets

(56) References Cited

U.S. PATENT DOCUMENTS

| | | | |
|---|---|---|---|
| 8,930,271 B1* | 1/2015 | Ellis | G06Q 30/0224 |
| | | | 705/41 |
| 9,424,572 B2* | 8/2016 | Bondesen | G06Q 20/3672 |
| 9,928,490 B1* | 3/2018 | Vancini | G06Q 40/02 |
| 9,996,835 B2 | 6/2018 | Dill et al. | |
| 10,002,354 B2* | 6/2018 | Digrigoli | G06Q 40/12 |
| 10,395,223 B2 | 8/2019 | Muthu et al. | |
| 2004/0044866 A1 | 3/2004 | Casazza | |
| 2008/0046366 A1* | 2/2008 | Bemmel | H04L 9/32 |
| | | | 705/44 |
| 2008/0140568 A1* | 6/2008 | Henry | G06Q 20/042 |
| | | | 705/40 |
| 2009/0132808 A1 | 5/2009 | Baentsch et al. | |
| 2010/0306668 A1 | 12/2010 | Williams et al. | |
| 2011/0282780 A1* | 11/2011 | French | G06Q 20/10 |
| | | | 705/39 |
| 2012/0031969 A1 | 2/2012 | Hammad | |
| 2013/0036048 A1* | 2/2013 | Campos | G06Q 20/36 |
| | | | 705/41 |
| 2013/0238491 A1* | 9/2013 | Bouey | G06Q 20/10 |
| | | | 705/39 |
| 2013/0238492 A1 | 9/2013 | Muthu et al. | |
| 2013/0304642 A1* | 11/2013 | Campos | G06Q 20/36 |
| | | | 705/41 |
| 2015/0019419 A1* | 1/2015 | Suzukake | G06Q 20/10 |
| | | | 705/41 |
| 2015/0302394 A1 | 10/2015 | Harper | |
| 2016/0125408 A1* | 5/2016 | Crawford | G06Q 20/405 |
| | | | 705/34 |
| 2016/0277413 A1 | 9/2016 | Ajitomi et al. | |
| 2017/0068952 A1 | 3/2017 | Brockmann et al. | |

OTHER PUBLICATIONS

A breakthrough for prepaid payment: End to end token exchange and management using secure SSL channels created by EAP-TLS smart cards; Urien, P., Pasquet, M., Kiennert, C., 2011 International Conference on Collaboration Technologies and Systems (CTS) (pp. 476-483); May 1, 2011. (Year: 2011).*

"Multiple Locations/Accounts for ACH payments now available", blog.123landlord.com, image capture Aug. 19, 2015 via Wayback Machine (Year: 2015).

* cited by examiner

SYSTEMS AND METHODS FOR FUNDS TRANSFERS VIA A TOKEN MANAGEMENT SYSTEM

CROSS-REFERENCE TO RELATED APPLICATIONS

This application is a continuation of U.S. patent application Ser. No. 15/344,089 entitled "SYSTEMS AND METHODS FOR FUNDS TRANSFERS VIA A TOKEN MANAGEMENT SYSTEM" by Hecht et al., filed on Nov. 4, 2016, which claims priority to U.S. Provisional Patent Application No. 62/252,049 entitled "SYSTEMS AND METHODS FOR FUNDS TRANSFERS VIA A TOKEN MANAGEMENT SYSTEM" by Hecht et al., filed on Nov. 6, 2015, both of which are herein incorporated by reference in their entireties and for all purposes.

TECHNICAL FIELD

Embodiments of the present disclosure relate generally to the field of interbank fund transfers. More particularly, the systems, methods, and apparatuses relate to associating a single token with multiple institutions in a federated environment to facilitate and provide convenience to payor and payees.

BACKGROUND

Parties using person-to-person (P2P), person-to-business (P2C), and business-to-business (B2B) funds transfer systems desire an ability to transfer the funds securely and quickly. In this regard, funds transfer systems may utilize cash, check, and/or digital payments (e.g., electronic wires, automated clearing house exchanges, etc.). However, digital payments in particular typically require some type of authentication for the payor (i.e., person or entity sending the funds) and identification of the payee (i.e., the person or entity receiving the funds). Authentication and identification can be complex, time-consuming, and in turn undesirable for payor and payees. Accordingly, enhanced funds transfer systems and methods are needed.

SUMMARY

A first exemplary embodiment relates to a method for managing a token in a federated fund transfer environment. The method includes receiving, by a token management system in a federated fund transfer system, a designation of a single token; receiving, by the token management system, a token management designation adapted to manage the single token; receiving, by the token management system, a rule designation for the token to enable association of the single token with two or more entities of the federated fund transfer system; and generating, by the token management system, a rule based on the rule designation to cause application of the rule with the single token in a subsequent fund transfer transaction utilizing the single token.

Another exemplary embodiment relates to a computer-implemented method for managing tokens in fund transfers in a federated fund transfer environment. The computer-implemented method includes associating, by a processor, a single token of a user with a first account and a second account, wherein the association is based on a predefined rule; receiving, by the processor, an indication of a fund transfer request from the user, wherein the indication includes an amount of funds, a recipient, and a fund transfer date; receiving, by the processor, an indication of payment to the user, wherein the indication includes an amount of received funds, a sender, and a sent fund transfer date; and causing, by the processor, a selective credit and debit to at least one of the first account and the second account based on the indication of the fund transfer request and the indication of the payment in accord with the predefined rule.

A further exemplary embodiment relates to a token management system adapted for use in a federated fund transfer environment. The token management system includes a token repository structured to store one or more public tokens of a user; a token management module structured to provide management of the one or more public tokens to the user; and a rules engine communicably coupled to each of the token repository and the token management module, wherein the rules engine is structured to provide use of a single public token with two or more entities in the federated fund transfer environment according to a predefined rule.

These and other features, together with the organization and manner of operation thereof, will become apparent from the following detailed description when taken in conjunction with the accompanying drawings.

DETAILED DESCRIPTION

Referring to the Figures generally, various systems, methods, and apparatuses relate to assigning a single token to multiple financial institutions in a federated funds transfer environment. While current systems may readily provide for funds transfers between members of the same financial institution, newer systems have been developed to facilitate funds transfers between members or registrants of two different financial institutions. To avoid providing confidential, private, or personal information to senders, the system, method, apparatus of the present disclosure may enable the creation of a token to identify senders/recipients (common tokens include a recipient's phone number or email address). In operation, after the sender identifies a recipient by their token, a payment transfer system facilitates the funds transfer from the sender to the recipient. Beneficially, a relatively easy and secure funds transfer process is provided for members of different financial institutions without having to reveal confidential information to facilitate the transfer (e.g., a checking account number or routing number for the recipient). Beneficially, the systems, methods, and apparatuses of the present disclosure may provide a token management system having a rules engine that facilitates the use of one token with many accounts and institutions in a federated funds transfer environment. The rules engine may include one or more rules that define how accounts of the user are credited/debited for a designated token based on the details of the funds transfer. For example, for payments to a recipient based on identification of the recipient by their mobile phone number token, payments from Sender A cause Account A at Bank A to be credited whereas payments from Sender B cause Account B at Bank B to be credited. Thus, a single token (mobile phone number) is used in each transaction, however, the details of the transaction cause the transaction to be tracked differently and enable a single token to be used with two or more accounts and entities. Advantageously, users of the system need not have multiple tokens for each account in the system; rather, the users may define how a single token can be used with each account in the system. This simplification may reduce complexity to the user and enhance a user experience with the system. These and other features of the present disclosure are described more fully herein below.

Figure 1:
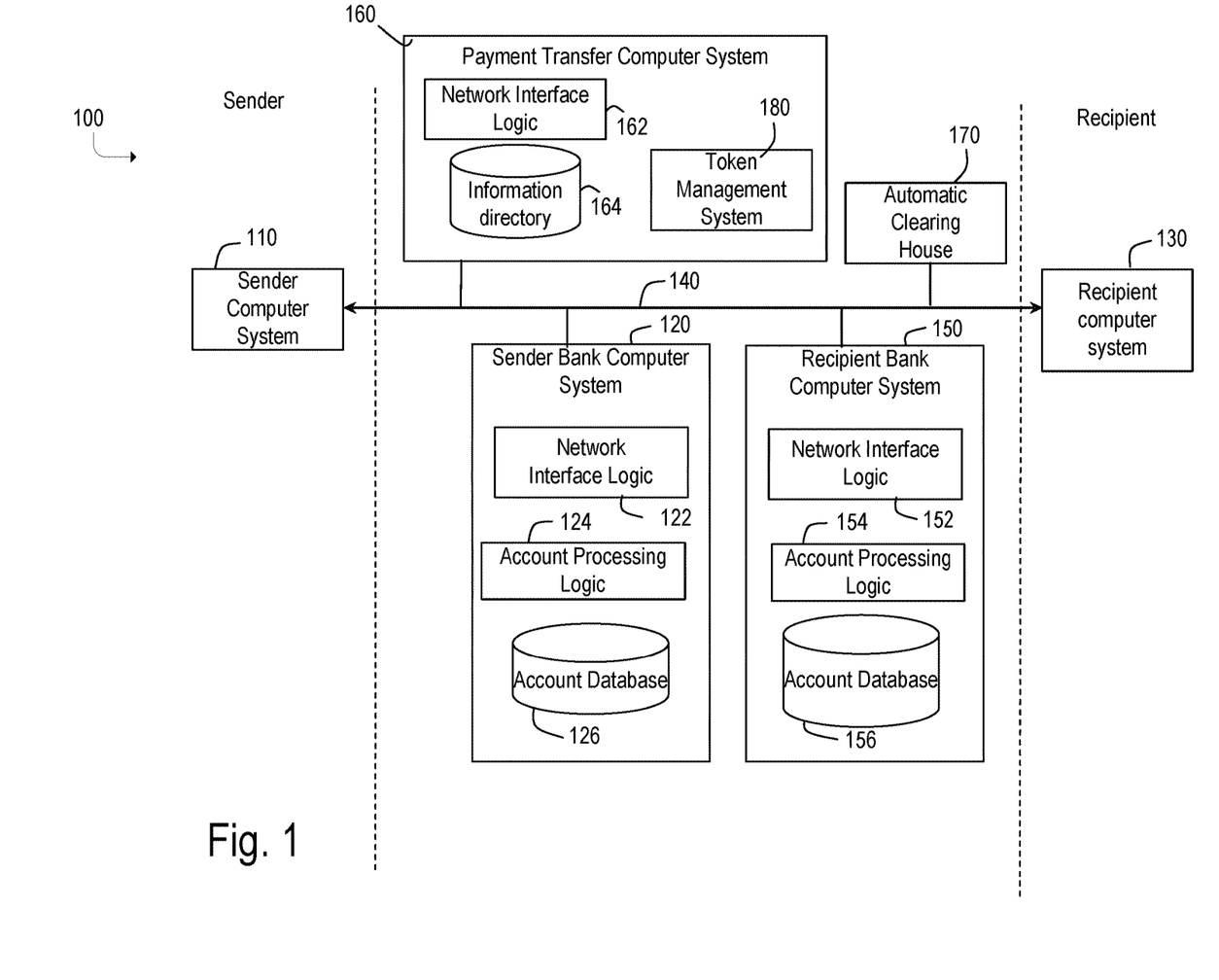
FIG. 1 is a schematic diagram of a fund transfer system in which a sender (i.e., payor) and a recipient (i.e., payee) may use different banking institutions according to an example embodiment.

Referring to FIG. 1, a fund transfer system 100 is shown according to one embodiment. The fund transfer system 100 may be utilized by payors to send funds to payees and by payees to receive the funds from payors, e.g., via automatic clearing house (ACH), or in another manner. The payors and payees may be individuals or business entities, such that the funds transfer system 100 may facilitate P2P, P2B, and/or B2B funds transfers. Moreover, the fund transfer system 100 may be used for both intrabank transfers (i.e., transfers in which the payor and the recipient both have accounts at the same bank and the funds are transferred between the accounts within the same bank) and interbank transfers (i.e., transfers in which the payor and the recipient have accounts at different banks and the funds are transferred between the accounts at different banks). Because the fund transfer system may provide interbank transfers, the fund transfer system 100 may also be referred to as a federated fund transfer system herein. In this regard, the federated fund transfer system (or environment) indicates that sender/recipient of funds may have accounts at multiple different financial institutions.

The fund transfer system 100 may include, among other systems, a sender computer system 110 communicably coupled to a sender bank computer system 120. The fund transfer system 100 may also include a recipient computer system 130 communicably coupled to a recipient bank computer system 150. The fund transfer system 100 is also shown to include, a payment transfer computer system 160, an automated or automatic clearing house (ACH) computer system 170, and a network 140 that provides and facilitates the exchange of communications (e.g., data, instructions, commands, etc.) via the systems and components of FIG. 1. Accordingly, the network 140 may include any network including wired (e.g., Ethernet) and/or wireless networks (e.g., 802.11X, ZigBee, Bluetooth, Internet, etc.). In some embodiments, the network 140 may further include a proprietary banking network to provide secure or substantially secure communications.

Figure 5A:
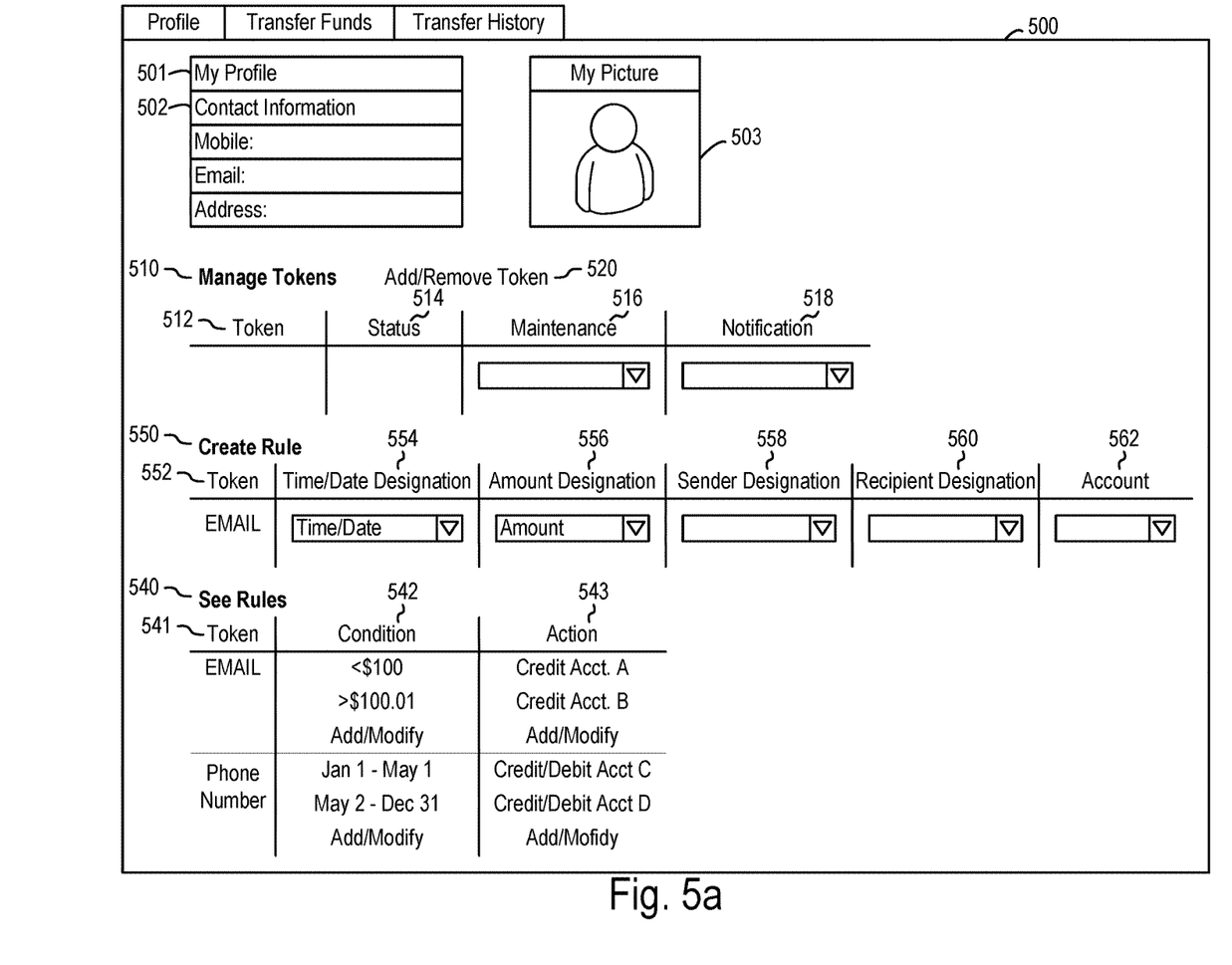
FIGS. 5A-5B are images of graphical user interfaces that may be used in connection with the flow diagram of FIG. 4, according to an example embodiment.
Figure 5B:
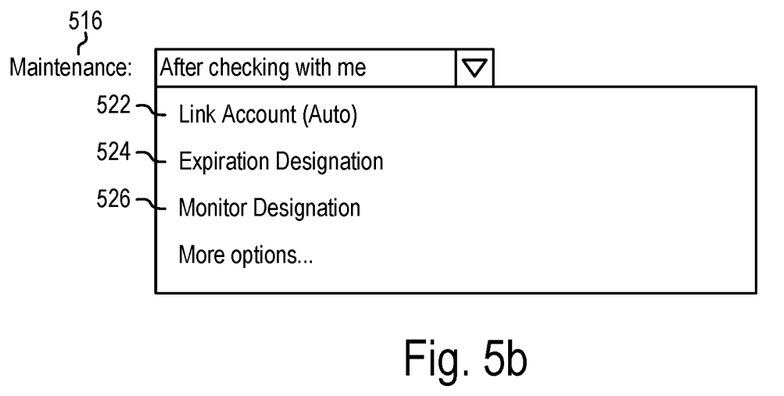

The sender computer system 110 is a computer system operated by the sender (i.e., payor) in the fund transfer system 100. The sender computer system 110 may include any type of computer system used in facilitating an electronic funds transfer to the recipient computer system 130, which is operated by the recipient (i.e., payee). Accordingly, the recipient computer system 130 and sender computer system 110 may include a mobile device (e.g., smartphone, smart watch, other wearables, etc.) and/or any other computing device (e.g., tablet computer, desktop computer, etc.). The mobile device and computing device may include a network interface for connecting to and communicating via the network 140. The mobile device and computing device may further include client applications for providing a graphical user interface to the sender and recipient, a client account application for facilitating logging into the system 100 for use, one or more processing components for processing received and/or provided instructions, and any other component or device typically included with a mobile device and/or computing device. Example graphical user interfaces that may be provided to the sender/recipient are shown in FIGS. 5A-5B.

The sender bank computer system 120 is operated by a financial institution that maintains accounts held by the sender (i.e., payor), such as demand deposit accounts, credit card accounts, home mortgage loans, student loans, and so on. Accordingly, the sender bank computer system 120 may include one or more computing components. The one or more computing components may include, servers, memory devices, processors, communication circuitry and the like.

In this regard and as shown, the sender bank computer system includes network interface logic 122, account processing logic 124, and an account database 126. The network interface logic 112 may include program logic that connects the bank computer system 110 to the network 140. The network interface logic 112 may facilitate secure communications between the bank and the payor and/or the recipient. The network interface logic 112 may also facilitate communication with other entities, such as other banks, settlement systems, and so on.

The account processing logic 114 is structured to perform account processing to process transactions in connection with the account(s) of the account holder, such as account credits and debits to checking and savings accounts, credits and debits to home mortgage and home equity accounts, credits and debits to student loan accounts, and so on. Accordingly, whenever funds are transferred into or out of an account of an account holder, the account processing logic 114 reflects an appropriate debit or credit in the account database 116, which stores account information (e.g., transactions, information about the account holder, and so on) for accounts that are maintained by the bank on behalf of its customers.

The account database 126 may hold, store, categorize, and otherwise serve as a repository for the customers of the sender bank computer system 120. In this regard, various customer profile characteristics may be stored by the account database 126. The customer profile characteristics may include, but are not limited to, an age, a membership date, account numbers and type of accounts held by the customer, various statements (e.g., credit/debit statements for the accounts), passkey information (e.g., an ability to change a password to log onto an online banking portal operated by the banking computer system 120), and so on. The account database 126 may also hold various preferences of the customer in regard to the account(s) held by the customer by the sender bank, which operates the sender bank computer system 120.

The recipient bank computer system 150 may be configured in a similar manner as the sender bank computer system 110. Thus, the recipient bank computer system 150 may include network interface logic 152, account processing logic 154, and an account database 156 corresponding to the network interface logic 122, account processing logic 124, and account database 126 of the sender bank computer system 120.

The ACH system 170 is used to transmit funds to and from bank accounts of the payors and payees. As is known, the ACH Network is a nationwide batch-oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. In non-guaranteed transaction situations, the RDFI may reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified. In some arrangements, the ACH system 170 includes tokenization logic in a similar manner as described herein with respect to the token management system 180. Accordingly, the ACH system 170 can encode (i.e., tokenize) account numbers into tokens and decode (i.e., detokenize) received tokens into customer account numbers.

Herein, the banks associated with computer systems 120 and 150 are assumed to be "member banks." That is, the banks associated with computer systems 120 and 150 are assumed to follow established protocols for transferring funds using the fund transfer system 100. While two member banks are shown in FIG. 1, it will be appreciated that there may be additional member banks.

To become "member banks," the banks may be required to register with the payment transfer computer system 160. The payment transfer computer system 160 is structured to facilitate payments or funds transfers between the sender and recipient and vice versa. The payment transfer computer system 160 may be operated or owned by a third party entity or a joint venture from the member banks in the pursuit of providing easy interbank fund transfers. As another example, the payment transfer computer system 160 may be supported and useable by an online community of individuals where such individuals obtain user names/login IDs or otherwise become registered members (e.g., users of Facebook®, LinkedIn®, and so on). As still another example, the payment transfer computer system 160 may be supported and provided by one or more of the bank computer systems 120, 150 in the system 100. In this regard, one or more of the banks 120, 150 may provide the structure and function that is described herein in regard to the payment transfer computer system 160.

It should be understood that while described herein as two or more different banks that form the federated environment, in other embodiments, the federated environment may include other and different type of entities that users may utilize tokens when exchanging funds with that entity. For example, the fund transfer system 100 may also include a hospital computer system operated by a hospital of the user. In another example, the fund transfer system 100 may include an insurance computer system operated by the insurance provider(s) for the user. In still another example, the fund transfer system 100 may further include gym computer systems operated by the gym or fitness centers, of which the user is a member. Each of the aforementioned entities may utilize a token as a proxy for an account held and operated by the user for that entity (e.g., a fitness account, the insurance account, etc.), such that the system 100 may facilitate funds transfer from the user (i.e., sender) to the entity computer system.

The payment transfer computer system 160 is shown to include network interface logic 162, an information directory 164, and a token management system 180 communicably and operatively coupled to each of the network interface logic 162 and the information directory 164. The network interface logic 162 may facilitate communicable coupling with the network 140 in order to facilitate fund transfers between the sender and recipient. The network interface logic 162 may be structured to generate and provide graphical user interfaces (e.g., web pages, etc.) for using the payment transfer computer system 160 (see, e.g., FIGS. 5A-5B). The network interface logic 162 may also facilitate subscription or enrollment with the system 100 for at least one of the sender, recipient, and entity (e.g., financial institution who wants to join the system 100).

The information directory 164 is structured to associate a user's token (e.g., mobile phone number, email address, etc.) to an account number of the user to facilitate receiving payments (when the user is the recipient) and providing payments (when the user is the sender). Accordingly, the information directory 164 may include a repository or database that holds or stores information for each user of the system 100 and their token (and associated accounts with their token). The information directory 164 may also store demographic information regarding the user (e.g., age, address, citizenship information, member banks associated with the user and non-member banks associated with the user, etc.).

The token management system 180 is structured to allow a user (i.e., a sender and/or recipient) to manage their tokens. As described herein, a "token" is a proxy for something else (e.g., bank account), such that "tokens" enable users of the system 100 to identify other users without using personal or confidential information of that identified user (i.e., the identified user's banking or routing numbers). Tokens may be public or private. A public token is a token that may be visible to the banking computer systems 120, 150 and other users. Examples of a public token may include, but are not limited to, an email address, a phone number, and any other unique identifier for the user. In comparison, a private token may be invisible (or otherwise unknown) by the user itself and other users. However, the private token may be known by the information directory 164 and used for association with the user's accounts in the computer systems 120, 150. An example of a private token may be a database identifier for utilization with the directory 164 to recall information regarding the particular user. Private and public tokens may utilize detokenization functions to decode the token to, e.g., determine the holder of that token (or account associated with that token, etc.).

In operation, a sender, via the sender computer system 110, may identify a recipient via a public token of the recipient (e.g., the recipient's email address). The sender may be authenticated by the sender bank computer system 120 and, upon authentication, the sender may identify an amount of funds to transfer to the recipient. The sender bank computer system 120 may query the payment transfer computer system 160 for the public token of the recipient if the public token is not associated with any records of the sender bank computer system 120. Upon identification, the payment transfer computer 160 may provide the member bank associated with the public token of the recipient to the sender bank computer system 120. The sender bank computer system 120 may then transfer the funds, via for example ACH, to the recipient bank computer system 150.

In some embodiments, if the recipient belongs to the same bank computer system as the sender based on the particular token of the recipient and its association, then the funds transfer may occur readily without the above-noted query. If the recipient is not a member of the payment transfer computer system 160, then the payment transfer computer system 160 may generate and provide a prompt to the recipient to join the system. Alternatively, the payment transfer computer system 160 may provide a prompt to the sender computer system 110 to provide additional details regarding the recipient to facilitate providing a prompt to that recipient for joining.

In some instances, the recipient may decline registration to the system 160. In which case, the system 160 may provide a prompt to the recipient to see if it is a member of another payment network (e.g., PAYPAL®). If this prompt is affirmed, the system 160 may facilitate the funds transfer via that payment network for the token of the recipient. If the recipient is neither a member of a payment network searchable by the payment system 160 or the system 160, then the payment transfer system 160 may provide a prompt to join one of these systems in order to facilitate the fund transfer. This prompt may be in the form of an electronic message (e.g., text message, email, etc.), voice message (e.g., phone call from a robo-dialer), and/or some combination therewith. Assuming the recipient elects to join, the user may be provided with subsequent prompts/request for information (e.g., account information, payment network identification, member bank information, demographic information, token information, and so on).

Accordingly, as described above, fund transfer between senders and recipients of the same bank and/or different banks is provided by the system 100. Further, the system also provides an electronic funds transfer to users who are either i) not yet registered with the system 160 or ii) registered with a payment network. Beneficially, the system 100 facilitates a wide range of electronic funds transfers for parties who utilize different account management systems (e.g., different banks, different payments networks, and so on). Furthermore, the aforementioned arrangement allows the sender to uniquely identify the recipient via a public token (e.g., with an e-mail address or other identifier), without necessarily having private/personal information regarding the recipient (i.e., the recipient's bank account/routing number). The token management system 180 is structured to enable management of one's tokens to facilitate use with the payment system 160.

Figure 2:
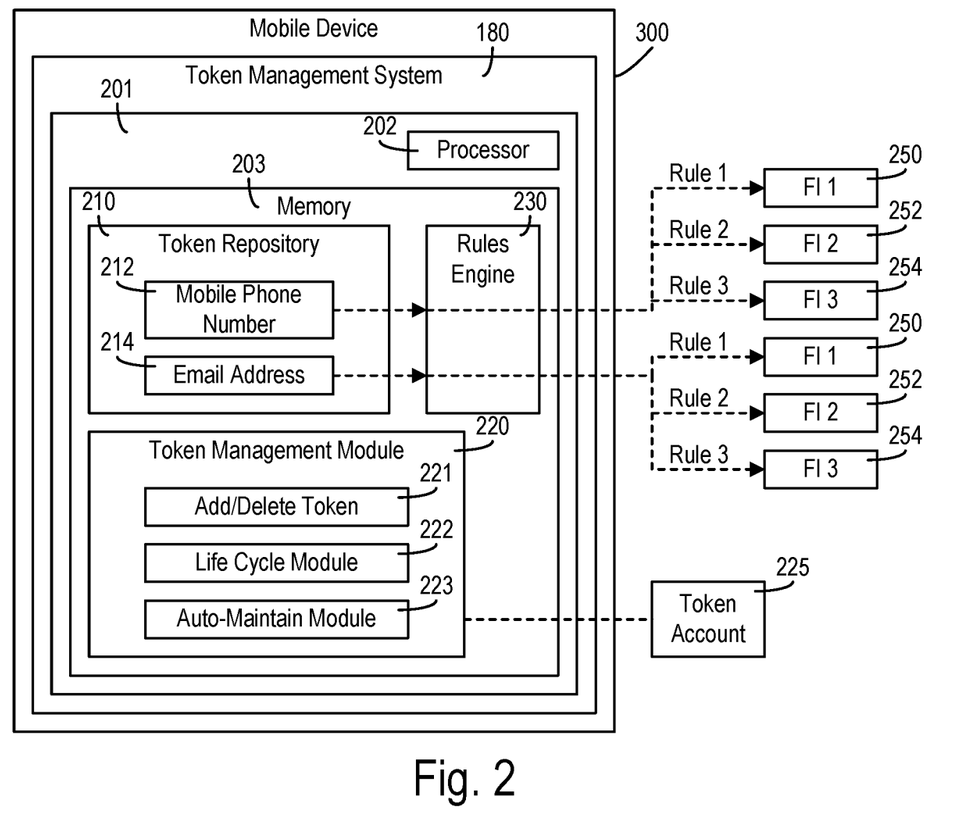
FIG. 2 is a schematic diagram of a token management system used with the system of FIG. 1, according to an example embodiment.

Referring now to FIG. 2, an example structure for the token management system 180 is illustrated. In the example depicted, the token management system 180 is implemented on or with a mobile device 300. In this regard, the token management system 180 may cause to provide graphical user interfaces like that shown in FIGS. 5A-5B. The mobile device 300 may include any type of mobile device capable of illustrating the content and output of the token management system 180. For example, the mobile device 300 may include any type of mobile and/or wearable device for a user. Wearable devices refer to any type of device that a user wears including, but not limited to, a watch (e.g., a smart watch), glasses (e.g., eye glasses, sun glasses, smart glasses, etc.), bracelet (e.g., a smart bracelet), etc. A mobile device may include any type of mobile device of a user including, but not limited to, a phone (e.g., smartphone, etc.) and a computing device (e.g., tablet computer, laptop computer, person digital assistant, etc.).

Generally speaking, the token management system 180 is structured to provide and facilitate management of tokens for use in the system 100. The token management system 180 is shown to include a processing circuit 201 having a processor 202 and a memory 203. The processing circuit 201 may include one or more processing circuits of the mobile device 300. In another embodiment, the processing circuit 201 may include a remotely-located processor or a combination of processing circuit(s) included with the mobile device 300 and remotely-located. As such, in some embodiments, the token management system 180 may be provided as an application on the mobile device 300.

The processor 202 may be implemented as a single general-purpose processor, a group of processors (e.g., a distributed server-based computing system), or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the processor 202 and provide computer code or instructions to the processor 202 for executing the processes described herein in regard to the token management system 180. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various modules for completing the activities described herein. More particularly, the memory 203 includes a token repository 210, a token management module 220, and a rules engine 230. The modules 210, 220, and 230 are structured to facilitate management of a user's token(s) (e.g., a sender or recipient of funds) and designate one or more rules with one or more tokens to facilitate use of a single token with multiple institutions (e.g., multiple banks) for use with electronic funds transfers. As an example and as described more fully herein below, a single token may be associated with a first bank account at Bank A and a second bank account at Bank B based on a user-defined rule and implemented by the rules engine 230. Beneficially, because users may have a limited number of applicable tokens, this structure and arrangement may allow a user to associate one token with many entities to increase flexibility of use of that token and provide enhanced convenience and appeal-ability of the system 100 to the user. Technically, the use of a single token may facilitate relatively faster transactions using electronic funds transfers in the system 100. In this regard, the payment transfer computer 160 may not need to sort through as voluminous amount of tokens for each user in order to expedite token identification and funds transfers. Further, by providing the user the ability to assign one token with multiple accounts, the strain on the system 100 may be reduced to due to a reduced memory storage and databasing need. For example, now users may only utilize one or two tokens with the system 100, such that each user does not have a plethora of tokens stored and occupying space. Thus, the present disclosure may improve the functionality of the computers in the system 100 itself as well as improving the field of electronic funds transfer by, e.g., providing convenience to a user.

While various modules with particular functionality are shown in FIG. 2, it should be understood that the token management system 180 may include any number of modules for completing the activities described herein. For example, the activities of multiple modules may be combined as a single module, as additional modules with additional functionality may be included, etc. Further, it should be understood that the token management system 180 may further control other activity beyond the scope of the present disclosure.

The token repository 210 is structured as a database repository for storing tokens of a user. As shown, the token repository includes a mobile phone number token 212 and an email address token 214. This configuration is not meant to be limiting as the token repository may also store any other public tokens of the user for utilization in the system 100.

The token management module 220 is communicably and operatively coupled to the token repository 210 and structured to provide and facilitate management of the tokens of the user. The token management module 220 is shown to include an add/delete token module 221, a lifecycle module 222, and an auto-maintain module 223. The add/delete token module 221 is structured to facilitate and allow the addition and deletion of tokens for a user. For example, via the add/delete token module 221, the user may remove their email address token.

The lifecycle module 222 is structured to receive a designation of a lifecycle for a token. The lifecycle for a token refers to the active period for the token (i.e., when the token may be used in fund transfers with the system 100). In this regard, the lifecycle may include a time duration (e.g., after three months, the phone number token is deleted), a use duration (e.g., after fund transfers of five times using this token, that particular token is deleted), and so on.

The token management module 220 may also include an auto-maintain module 223. The auto-maintain module 223 may be communicably coupled to a proxy for each respective token, shown as a token account 225. For example, in regard to the email address token 214, the token account 225 may be the account/profile for the email address (e.g., YAHOO! ® mail for a YAHOO!® email address token). In another example and in regard to the mobile phone number token 212, the token account 225 may be the online account associated with the mobile phone number (e.g., the carrier for the wireless account). In each example, by utilizing an online proxy for each token, the auto-maintain module 223 may receive updates and/or alerts regarding the account for the token. As such, if the token becomes inactive (e.g., the user changes their telephone number), the auto-maintain module 223 may respond accordingly (e.g., provide an alert to the user, deactivate that token, etc.). Beneficially, the auto-maintain module 223 facilitates automatic or nearly automatic maintenance of the user's tokens.

Response options for the auto-maintain module 223 are highly configurable and may be based on the detected status change for the token. For example, in regard to decommissioned tokens (e.g., a cancellation of a mobile phone number), the response may be to deactivate the token and provide a message to the user indicating deactivation (e.g., via a prompt next time the user logs onto to the system 100, the user may receive a message similar to "We have detected that your previously defined mobile phone number of XXX-XXX-XXXX has been cancelled. In response, we have decommissioned your mobile phone number token. Accordingly, you are now unable to send/receive funds using the mobile phone number of XXX-XXX-XXXX token. Please provide a new mobile phone number.").

According to one embodiment, connections established when the token was active/valid may remain valid/active after the token is deactivated. In this regard, a user may beneficially avoid having to re-establish those connections. In use, while the token may be unable to for sending/receiving funds, a user may only need to re-activate the token to have that token ready for use with the previously established relationships. Previously established relationships may facilitate relatively quicker funds transfer (e.g., avoid identification and authentication of the sender/recipient). According to another embodiment, after deactivation, previously established relationships may need to be re-established and formed.

Another response may be providing an alert (e.g., email, text message, prompt when the user logs onto the system, etc.) to the user if an account change is detected. For example, if the user has updated his/her address in their profile for their mobile phone number to reflect a residency address change, the auto-maintain module 223 provides an alert to the user to confirm the mobile phone number token is still valid. The user may then be required to confirm the address change prior to sending/receiving funds via the mobile phone number token.

Still another response may be limiting or restraining the use of the token for which the account change was detected. In this regard, the auto-maintain module 223 may be communicably coupled to the rules engine 230, such that these two modules may work in tandem to limit or restrain the use of the token. The limited use of the token may include, but is not limited to, triggering a predefined time duration until the token expires (e.g., three days, one week, etc.); limiting the amount of funds transfer that may be sent and/or received (e.g., receive any amount via this token but only send $100 until the user resolves the detected change in the token account); limit who may send funds or receive funds via the affected token (e.g., limit it to a predefined group of people or entities that may utilize the affected token); etc. As an example, an account change may be detected with respect to the mobile phone number. In response, an alert is provided to the user to confirm or deny the account change. If the user does not update the account to either confirm or deny, the auto-maintain module 223 triggers an auto-expire feature for the token, wherein the mobile phone number token is deactivated in a predefined time period (e.g., three hours).

Of course, it should be understood that the aforementioned responses are exemplary only. The present disclosure contemplates any combination of the aforementioned responses as well as any additional responses that may be used by the auto-maintain module 223 for facilitate auto-maintenance of stored tokens.

Figure 3:
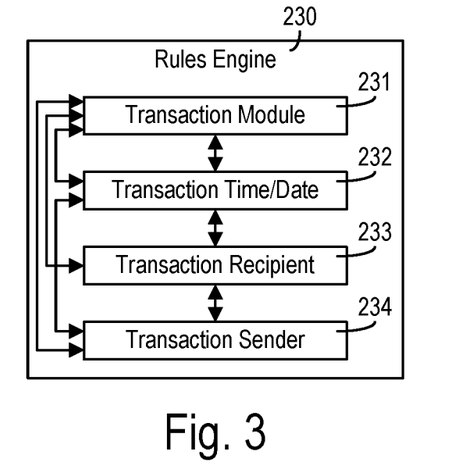
FIG. 3 is a schematic diagram of a rules engine included with the token management system of FIGS. 1-2, according to an example embodiment.

Still referring to FIG. 2 in combination with FIG. 3, the rules engine 230 is shown to include a plurality of modules for tracking and categorizing funds transfers into a plurality of accounts for a plurality of entities (shown as financial institutions) based on the details regarding the funds transfer. Beneficially, the rules engine 230 enables a single token (e.g., mobile phone number token 212) to be associated with multiple institutions and multiple accounts. Accordingly, when used in the federated environment of FIG. 1, a user need not create numerous tokens for each account at each institution; instead, the user may designate rules via the rules engine 230 to assign one token to multiple accounts.

As shown in FIG. 2, the rules engine 230 is structured to apply a rule to associate one token with multiple entities. In FIG. 2, in regard to the mobile phone number token 212, the rules engine 230 applies a first rule to designate when the mobile phone number token 212 is associated with a first financial institution 250; the rules engine 230 applies a second rule to designate when the mobile phone number token 212 is associated with the second financial institution 252; and, the rules engine applies a third rule to designate when the mobile phone number token 212 is associated with the third financial institution 254. In regard to the email address token 214, the rules engine 230 uses a second set of rules to define when the email address token 214 is associated with the first financial institution 250, second financial institution 252, and third financial institution 254. Thus, a single token is being utilized with multiple institutions.

As used herein in regard to the rule applied by the rules engine 230, the "rule" refers to a set of instructions that define conditions for when a token is associated with a designated entity (e.g., a certain financial institution such as Bank A). The set of instructions may also define conditions for when a token is associated with a designated account of a designated entity (e.g., a demand deposit account of the designated financial institution). As also used herein to define when the token is linked with a designated account and/or entity, the term "associate" is meant to indicate the linking or communicable coupling with the designated account or entity. For example, if the designated account is a checking account and the token is a mobile phone number, the association to the checking account indicates that funds transfers using the mobile phone number token represent credits or debits to that checking account. In another example, in a system that includes more than financial institutions, if the designated account is another entity member account (e.g., a gym member account) and the token is an email address, association means that funds transfers based on identification of the email address to and from the another entity account (e.g., gym membership account) are reflected as debits or credits to that account. Thus, "association" is meant to be broadly interpreted and generally refers to the linking of the token with the account or entity, such that actions regarding that token (e.g., sent payments, received payments, etc.) may be transmitted to the account or entity for bookkeeping.

Still referring to FIG. 3, as shown, the rules engine 230 includes a transaction amount module 231, a transaction time/date module 232, a transaction recipient module 233, and a transaction sender module 234. The designation of conditions in at least one of the modules 231-234 are structured to enable generation of a rule by the rules engine 230 for use with a designated token in the fund transfer system 100.

The transaction amount module 231 is structured to receive a designated token, receive at least one transaction amount range (i.e., fund transfer amount), and receive a designated entity and/or account for the at least one transaction amount range. In response to these designations, the transaction amount module 231 is structured to generate a rule that defines when the designated token is associated with the designated entity and/or account based on the transaction amount range. As an example, the token may be an email address and the user may designate the following: received payments from $0.01 to $100 are credited to Account A at Bank A; received payments greater than $100.01 are credited to Account B at Bank B; sent payments from $0.01 to $100 are debited from Account A at Bank A; and, sent payments greater than $100.01 are debited from Account B at Bank B. Accordingly, if a second user needs to pay the first user and desires to use the system 100, the second user may identify the first user via the email address token and then provide a payment amount. Based on the payment amount, the received payment is either credited automatically to Account A at Bank A or Account B at Bank B. Beneficially, the user (in this case, the first user) is able to manage their funds transfers in the system 100 with little monitoring.

The transaction time/date module 232 is structured to receive a designated token, receive a time and/or date designation, and receive a designated entity and/or account based on the time and/or date designation. In response to these designations, the transaction time/date module 232 is structured to generate a rule that defines when the designated token is associated with the designated entity and/or account based on the time and/or date designation. As an example, the token may be an email address and the user may designate the following: received payments between January 1 and May 1 are credited to Account A at Bank A; received payments from May 2 to December 31 are credited to Account B at Bank B; sent payments from January 1 to May 1 are debited from Account A at Bank A; and, sent payments from May 2 to December 31 are debited from Account B at Bank B. Accordingly, if a second user pays the first user and desires to use the system 100, the second user may identify the first user via their email address and then provide a payment amount and a payment transfer date. Based on the payment transfer date, the received payment is either credited automatically to Account A at Bank A or Account B at Bank B. As mentioned above, the transaction time/date module 232 may also generate the rule based on the time of funds transfer in addition to or in place of the date of funds transfer. Still using the above example, the user may further define that all received payments during business hours from January 1 to May 1 are credited to Account A at Bank A; all received payments during non-business hours (e.g., on weekends and during hours other than 8am-5 pm) from January 1 to May 1 are credited to Account B at Bank B; all sent payments during business hours from January 1 to May 1 are debited from Account A at Bank A; and, all sent payments during non-business hours from January 1 to May 1 are debited from Account B at Bank (similar rule designations may be used for business and non-business hours from May 2 to December 31). In this example, if a second user sends a payment using the email address of the first user on May $3^{rd}$ after business hours, the transaction time/date module credits Account B at Bank B of the first user.

It should be understood that the time/date module 232 may also utilize other time/date or calendar designations. For example, the time/date module 232 may utilize holiday designations (e.g., received money from Christmas is transferred into Account A at Bank A while everything else is transferred to Account B at Bank B). Accordingly, the activities of the time/date module 232 are intended to be broadly interpreted.

The transaction recipient module 233 is structured to receive a designated recipient and receive a designated entity and/or account based on the designated recipient for a designated token. In this regard, the transaction recipient module 233 tracks and categorizes funds transfers based on the recipient. As an example and for a particular designated token, all payments to recipient A are debited from Account A at Bank A; all payments to recipient B are debited from Account B at Bank B; and, all payments to recipient C are debited from Account C at Bank C. As such, if the user designates recipient C, the funds transfer amount designated is debited from Account C. The creation of a rule by recipient may be advantageous to business owners who have several accounts who desire to keep track of business-related expenses easily (e.g., for recurring business expenses, the business owner may easily track that expense as related to a particular business account to make bookkeeping easier and less time-consuming).

The transaction sender module 234 is structured to receive a designated sender and receive a designated entity and/or account for the designated sender and a designated token. In this regard, the transaction sender module 234 is similar to the transaction recipient module 233 except that the transaction sender module 234 tracks and categorizes funds transfer in the system 100 for the user based on the sender. As an example and for a particular designated token, all received funds transfers from sender A are credited to Account A at Bank A; and, all received payments from sender B are credited to Account B at Bank B; and, all received payments from sender C are credited to Account C at Bank C. Accordingly, if the user receives a payment from sender B, the payment is credited to Account B. Like the transaction recipient module 233, the transaction sender module 234 facilitates efficient tracking and categorization of electronic funds transfers in the system 100 for the user based on the identity of the sending party.

As shown in FIG. 3, each of the modules 231-234 are communicably and operatively coupled to each other. Because at least in part of this coupling, the modules 231 may be used in combination to define rules using a plurality of conditions (e.g., a rule that includes a designation of a transaction recipient and a transaction sender, a rule that includes a designation of an amount as well as a recipient, a rule that includes a designation of an amount as well as a time/date, etc.). In this regard, while the modules 231-234 were explained above as being independent of each other, this was done for clarity and is not meant to be limiting. In one or more example embodiments, one or more of the activities of the modules 231-234 may be combined to define relatively more complex rules and facilitate a relatively more enhanced configurability option for the user. It should also be understood that the aforementioned rule categories (i.e., transaction amount, transaction time/date, transaction recipient, and transaction sender) is not meant to be exhaustive. The present disclosure contemplates that other rule categories may also be used alone and in combination with the aforementioned categories to enable the use of a single token with one or more accounts and institutions.

Figure 4:
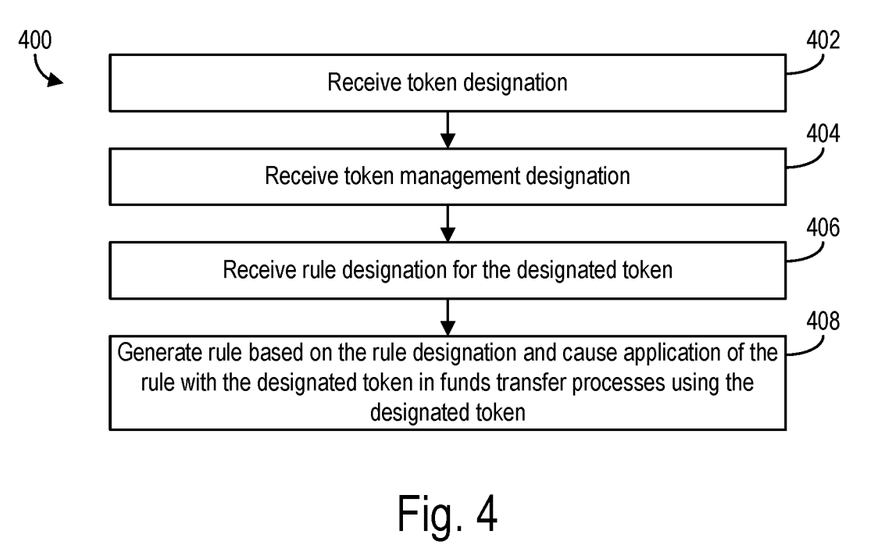
FIG. 4 is a flow diagram of a method of managing one's tokens in a federated funds transfer environment, according to an example embodiment.

Referring now to FIG. 4 in combination with FIGS. 5A-5B, an example method of managing a token in a federated environment for providing fund transfers is depicted. Method 400 may be implemented with the token management system of FIGS. 1-3, such that reference may be made to one or more components of FIGS. 1-3 in explaining method 400.

At process 402, a token designation is received. The token designated refers to a token (e.g., email address or mobile phone number) that the user desires to manage, where management may include notification settings, rule settings, and/or maintenance settings. At process 404, a token management designation is received. The token management designation refers to a management setting associated with the designated token. The setting may include a notification setting. The notification setting may define when notifications are provided (e.g., whenever an action occurs with respect to the designated token, based on a predefined time period such as weekly, some combination therewith, etc.) and how notifications are provided (e.g., via email, text message, etc.). In some embodiments, the notification setting may also enable a user to designate the content of the notification. The content may range from a relatively simple "Alert" indicator that is transmitted via the defined route (e.g., text message) or a relatively more content-rich message that may include details regarding the alert. Because a user may have multiple tokens, the notification settings may be complex/different for each of the multiple tokens. The setting may also include a maintenance setting (e.g., via at least one of the life cycle module 222 and the auto-maintain module 223). The maintenance setting may prescribe when the designated token expires (e.g., after a predefined time period, after a predefined number of uses, etc.). As described herein above, the maintenance setting may also allow a linking to the token account (e.g., token account 225) to facilitate auto-maintenance of the token. At process 406, a rule designation for the designated token is received. As mentioned above, the rule designation refers to a set of conditions that define when the token associates with a predefined account (e.g., based on the funds transfer amount, the time of day of the funds transfer, the dates of the funds transfer, the sender identity, etc.). Beneficially, via processes 404-406, the user may define a number of settings/preferences associated with each of their tokens to provide enhance management of their tokens. At process 408, the rule is generated based on the rule designation and application of the rule is caused with the designated token. Thus, via the rule designation, the user may control how sent/received funds are tracked with respect to multiple accounts and multiple entities in a federated fund transfer environment.

FIGS. 5A-5B depict example graphical user interfaces that may be utilized to implement process 400. FIG. 5A depicts an example screenshot that a user may observe upon logging into the system 100. As shown, the webpage 500 includes a profile section 501 where a user may define their demographic and contact information 502 (e.g., address, phone number, email address, age, gender, etc.) and provide a profile picture 503 if desired. As mentioned above, the example webpage 500 may be provided as a webpage (like shown) on a mobile device, such as mobile device 300 or, in other embodiments, the screenshot may be embodied as an application running on the mobile device, such as mobile device 300.

The webpage 500 includes an interactive section for managing the tokens of the user (i.e., token management portion 510). The token management portion 510 may provide the activities described above with regard to process 404. In this regard, the token management portion 510 may be generated and supported by the token management system 180. As shown, the token management portion 510 includes a table with a token 512, status 514, maintenance 516, and notification 518 columns. The token column 512 may include a pulldown menu enabling selection of a token (e.g., mobile phone number, email address, etc.). The status column 514 may facilitate reception of a status designation for the designated token. The status designation may be indicative of whether the designated token is verified and/or active. Verification may refer to a user confirming the accuracy of the token (e.g., the user may provide an input indicating that the mobile phone number listed is accurate). An active token refers to a token that has been confirmed accurate and is ready for use (e.g., to user may receive payments from another user who identifies the confirmed accurate token). The notification column 518 may provide an alert/notification to the user for each of his/her tokens. The alerts/notifications may indicate whether a change or event has occurred with regard to the designated token to cause an alert. For example, another user may have transferred funds to the user via identification of the designated token and an alert is provided to inform the user of this transfer. The alert/notification may be based on the maintenance of the designated token as explained in regard to FIG. 5B and column 516. At the top of webpage 500, a preferences tab is illustrated. The preferences tab may be used to define when alerts or notifications are provided, how they are provided, the content of the indicator in the column 516 and other preferences associated with the user of the system 100. Further, the webpage 500 may also include an add/remove token 520 feature that allows adding or deleting tokens with the system 100.

The maintenance column 516 may indicate how the designated token is provisioned and provide options for controlling the provisioning of the token. Referring now to FIG. 5B, an example pulldown menu for the maintenance column 516 is depicted. As shown, the user may have configurability options including a link account (auto) feature 522, an expiration designation 524, and a monitor designation 526. The link account feature 522 is structured to enable the user to link or couple the token with the designated account (e.g., to link the profile associated with the email address token, to link the bill pay and/or profile section of the mobile phone number account to the mobile phone number token). As such, when updates occur at the token account location, these updates can be reflected and considered by the token management system 180. More particularly, this enables the token to be automatically or nearly automatically maintained with little input from the user. As an example, if the mobile phone account is cancelled, a notification may be provided to the token management module 220, which in response causes generation of a message that is displayed on the webpage 500. The message may be provided in the notification 518 column and indicate that the user's mobile phone number token has been deactivated in response to the account cancellation message. If the user does not desire auto-maintenance (in this example, auto-cancellation), the user may select an expiration designation 524.

The expiration designation 524 may allow a user to designate when the token becomes deactivated (e.g., no longer able to be used with the system 100). The expiration designation 524 may be based on a predefined amount of time, a predefined amount of uses of the token, upon receipt of a change in a status of the token (e.g., the mobile phone number token of the user has been cancelled, etc.). The user may also predefine monitor designations 526. The monitor designations may include providing an indication of what content the user desires to observe in regard to the token (e.g., if the token is on auto-maintain, when the token is set to expire, if there has been any activity in regard to the token such as funds transfers or activity from the linked account, etc.). The monitor options may be implemented via the notification column 518 to provide selected and desired messages/information to the user. In this regard, the activities caused by the designations in the maintenance column 516 may cause notifications in the notification 518 column.

Referring back to FIG. 5A, the webpage 500 is also shown to include a create a rule 550 section. The create a rule 550 section facilitates the designation of a rule with one or more tokens. Accordingly, the create a rule 550 section may be generated and maintained by the rules engine 230.

As shown, the create a rule 550 section includes a token column 552, a time/date designation 554, an amount designation 556, a sender designation 558, a recipient designation 560, and an account designation 562. The token column 552 enables selection of a token (e.g., mobile phone number). The time/date designation 554, amount designation 556, sender designation 558, and recipient designation 560 columns enable configuration of a rule(s) associated with the selected token. For example, the user may define that Checking Account XXXXXXXX is credited when payments are made to User B. In another example, the user may define payment amount ranges for multiple accounts that indicate when those accounts are credited based on the fund transfer payment amount. As such, the user may designate a payment from an account based on identification of the token, which facilitates how the payment amount is tracked based on the generated rule.

Based on the creation of one or more rules, the webpage 500 may include a See Rules 540 section. The See Rules 540 section provides a visual observation to the user regarding the rules the user has created in regard to one or more tokens. In this example, for the designated token of email address, the user has defined a rule based on a payment amount: for payments less than $100, Account A is credited; and, for payments greater than $100.01, Account B is credited. For the designated token of mobile phone number, the user has defined that for received/sent funds transfer from January 1 to May 1, the credit/debit is made to Account C and for received/sent funds from May 2 to December 31, the credit/debit is made to Account D. Thus, the See Rules 540 section shows the token 541, condition 542, and action 543 that is taken by the token management system 180 in response to the condition. That is to say, the See Rules 540 section provides an efficient and easy-to-see depiction of the rules and their affect on payments/deposits for a user for one or more tokens.

It should be understood that while FIGS. 5A-5B depict a webpage with various functionality in pulldown menu format, other embodiments may use other designation mechanisms (e.g., a text designation, etc.). Further, it should also be understood that other embodiments may use more or less features with the webpage to enhance or customize the configurability provided to the user.

Figure 6:
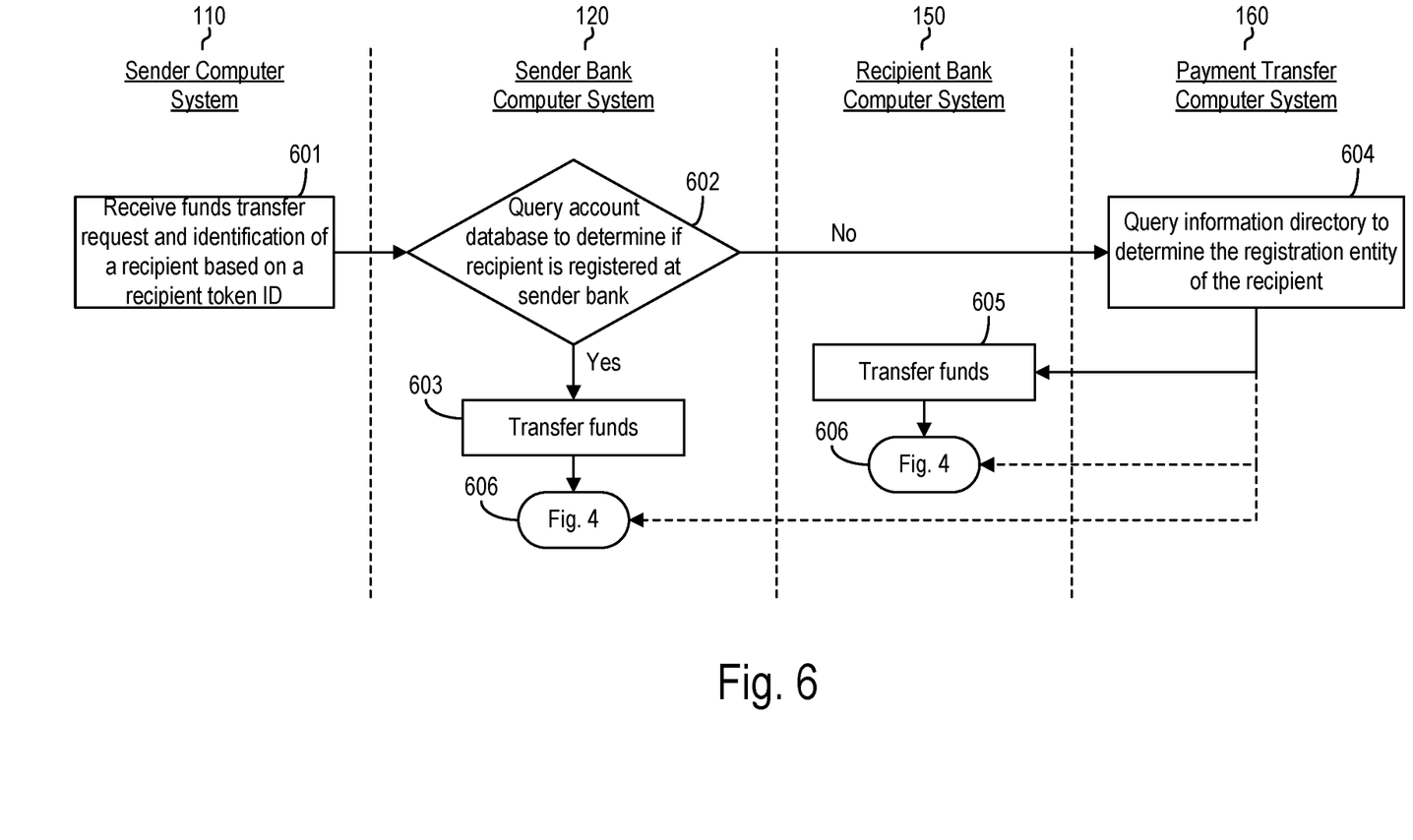
FIG. 6 is a flow diagram of a method of transferring funds in a federated funds transfer environment using the result of the method of FIG. 4, according to an example embodiment.

Referring now to FIG. 6, an example method 600 for providing a funds transfer in a federated environment is shown. Method 600 may be used following method 400, such that the funds transfer of method 600 may utilize one or more rules. Method 600 represents an example funds transfer process using system 100 of FIG. 1 and applying the result of FIG. 4 (i.e., one or more rules). In this regard, method 600 can represent intermember funds transfer (e.g., transfers where the sender and recipient are registered with accounts at different entities, such as two different banks) and intramember funds transfer (e.g., transfers where the sender and recipient are registered at the same member entity). In this regard, a member entity is denoted by the entity's membership to the system. If the recipient is registered with a non-member entity, method 600 may include the additional steps of providing a prompt to the recipient to register with a member entity, providing a prompt to the non-member entity to become a member entity, and/or facilitating the payment via another channel, such as via a payment channel. In method 600, the assumption is that both sender and recipient are registered with a member entity of the system, where registered indicates that the sender and recipient have created a public token that enables their identification to send/receive funds electronically and without the providing of more personal or confidential information (e.g., such as via identification of the recipient's checking account number). Further, method 600 is shown in regard to the features of FIG. 1 (e.g., sender bank computer system 120, recipient bank computer system 150, etc.), such that the fund transfer depicted is between two financial institutions.

At process 601, the sender, via the sender computer system, provides a funds transfer request to a recipient based on identification of the recipient by the recipient's token. For example, the sender may identify the recipient by the recipient's mobile phone number. At process 602, the sender bank computer system (e.g., sender bank computer system 120) receives the request and queries the account database of the sender bank computer system to determine if the recipient is registered with the sender bank. If yes, the funds transfer may occur readily as an intrabank transfer (process 603). If no, the request is provided to the payment transfer computer system. The payment transfer computer system may query the account database (e.g., account database 126) to determine the registration entity of the recipient based on the recipient's token (process 604). Upon identification, the payment transfer computer system may facilitate the funds transfer between the two member entities (process 605).

During the funds transfer process, the rules created by the recipient and sender may be utilized (process 606). In this regard, the funds from the sender may be accounted for based on at least one of the sender's identity, the fund transfer amount, the fund transfer date, the fund transfer time, and the recipient's token used to identify the recipient. Similarly, at the outset of the transaction, the debit to the sender may be accounted for based on at least one of the recipient's identity, the fund transfer amount, the fund transfer date, the fund transfer time, and the designated payment from account. Advantageously, the rule(s) created in method 400 may provide enhanced record keeping procedures and yield convenience to the users in being able to use a single token with multiple accounts and institutions.

It should be understood that while the process 606 is illustrated as being performed by each of the sender bank computer system 120 and the recipient bank computer system 150, this depiction is for clarity. According to one embodiment, the process 400 is performed by the token management system 180 of the payment transfer computer system 160. However, in other embodiments, the rules (i.e., process 400) may be provided to each of the bank computer system 120, 150 for performance. All such variations are intended to fall within the spirit and scope of the present disclosure.

The above-described systems and methods provide for assigning a single token to two or more accounts (where the accounts could be at the same or different entities) in providing an interbank and intrabank funds transfer system. The above-described systems and methods add convenience, configurability, and enhancement to funds transfer systems implemented in a federal environment, such as any system that uses a user-defined token to facilitate a funds transfer to that person or entity.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise NVRAM, RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A computer-implemented method, comprising:
receiving, by a token management system of a mobile device, a designation of a single token;
receiving, by the token management system of the mobile device, a token management designation adapted to manage the single token based on the designation, wherein the token management designation includes an expiration designation for the single token regarding a number of uses of the single token or an amount of time before the single token expires;
linking, by the token management system of the mobile device, the single token to an online account associated with the single token based on receiving a user input to couple the token management system to the online account such that the token management system is configured to receive automatic updates regarding the single token;
receiving, by the token management system of the mobile device, a rule designation for the single token to enable association of the single token with two or more entities;
generating, by the token management system of the mobile device, a rule based on the rule designation to cause application of the rule with the single token in a subsequent fund transfer transaction utilizing the single token;
storing, by the token management system of the mobile device, the rule in association with the single token;
providing, by the token management system of the mobile device, a graphical user interface depicting the rule on the mobile device;
based on the linking, receiving, by the token management system of the mobile device, an update regarding the online account and (i) deactivating the single token to prevent fund transfers utilizing the single token and (ii) providing an alert regarding the update;
reactivating, by the token management system of the mobile device, the single token based on an input by the user in response to the alert;
receiving, by the token management system of the mobile device, a fund transfer transaction request identifying the single token for a fund transfer, the fund transfer transaction request including at least one of a fund transfer amount or a fund transfer date;
applying, by the token management system of the mobile device, the rule based on the single token and the at least one of the fund transfer amount or the fund transfer date to process the fund transfer;
after the fund transfer, detecting, by the token management system of the mobile device, the expiration designation for the single token; and
deleting, by the token management system of the mobile device, the single token based on the detected expiration designation by removing the single token from the token management system of the mobile device.

2. The computer-implemented method of claim 1, wherein the single token is a public token, wherein the public token includes one of an email address or a mobile phone number.

3. The computer-implemented method of claim 1, wherein the mobile device is at least one of a phone, a smartphone, a tablet computer, a laptop computer, or a smart watch.

4. The computer-implemented method of claim 1, wherein the token management designation includes a notification setting regarding the single token, wherein the notification setting defines a content amount, a frequency of providing the content amount, and a route of providing the content amount.

5. The computer-implemented method of claim 1, further comprising:
provide, by the token management system of the mobile device, a notification to the user indicating the single token is expired.

6. A mobile device, comprising:
a network interface configured to communicate data over a network;
a token management system configured to facilitate use of one or more public tokens of a user and comprising a processor, wherein the token management system further includes a memory that stores instructions that, when executed by the processor, cause the processor to:
receive a designation of a single token of the one or more public tokens;
link the single token to an online account associated with the single token based on receiving a user input to couple the token management system to the online account such that the token management system is configured to receive automatic updates regarding the single token;
receive a token management designation adapted to manage the single token based on the designation, wherein the token management designation includes an expiration designation for the single token, wherein the expiration designation includes one of a number of uses with the single token or an amount of time before the single token expires;
receive a rule designation for the single token to enable association of the single token with two or more entities;
generate a rule based on the rule designation to cause application of the rule with the single token in a subsequent fund transfer transaction utilizing the single token;
store the rule in association with the single token;
provide a graphical user interface depicting the rule on the mobile device;
based on the link, receive an update regarding the online account and (i) deactivate the single token to prevent fund transfers utilizing the single token and (ii) provide an alert regarding the update;
reactivate the single token based on an input by the user in response to the alert;
receive a fund transfer transaction request identifying the single token for a fund transfer, the fund transfer transaction request including at least one of a fund transfer amount or a fund transfer date;
apply the rule based on the single token and the at least one of the fund transfer amount or the fund transfer date to process the fund transfer;
after the fund transfer, detect the expiration designation for the single token; and
delete the single token based on the detected expiration designation by removing the single token from the token management system of the mobile device.

7. The mobile device of claim 6, wherein the memory further comprises:
a token repository configured to store the one or more public tokens of the user;
a token management module structured to provide management of the one or more public tokens of the user; and
a rules engine communicably and operatively coupled to each of the token repository and the token management module, wherein the rules engine is configured to generate the rule based on the rule designation.

8. The mobile device of claim 6, wherein the single token includes one of an email address or a mobile phone number.

9. The mobile device of claim 6, wherein the mobile device is at least one of a phone, a smartphone, a tablet computer, a laptop computer, or a smart watch.

10. The mobile device of claim 6, wherein the token management designation includes a notification setting regarding the single token, wherein the notification setting defines a content amount, a frequency of providing the content amount, and a route of providing the content amount.

11. The mobile device of claim 6, wherein the memory further causes the processor to:
provide a notification to the user indicating the single token is expired.

12. A computer-implemented method, comprising:
receiving, by a token management system of a mobile device, a designation of a single token of a plurality of tokens;
receiving, by the token management system of the mobile device, a token management designation adapted to manage the single token based on the designation, wherein the token management designation includes an expiration designation for the single token regarding a number of uses of the single token or an amount of time before the single token expires;
linking, by the token management system of the mobile device, the single token to an online account associated with the single token based on receiving a user input to couple the token management system to the online account such that the token management system is configured to receive automatic updates regarding the single token;
receiving, by the token management system of the mobile device, a transaction amount range for an amount of funds transferred in a funds transfer transaction;
receiving, by the token management system of the mobile device, a designated target for the funds transfer transaction;
generating, by the token management system of the mobile device, a rule associating at least the single token, the transaction amount range for the amount of funds transferred in the funds transfer transaction, and the designated target for the funds transfer transaction;
providing, by the token management system of the mobile device, a graphical user interface depicting the rule on the mobile device;
based on the linking, receiving, by the token management system of the mobile device, an update regarding the online account and (i) deactivating the single token to prevent fund transfers utilizing the single token and (ii) providing an alert regarding the update;
reactivating, by the token management system of the mobile device, the single token based on an input by the user in response to the alert;
receiving, by the token management system of the mobile device, a fund transfer transaction request identifying the single token for a fund transfer, the fund transfer transaction request including at least one of a fund transfer amount or a fund transfer date;
applying, by the token management system of the mobile device, the rule based on the single token and the at least one of the fund transfer amount or the fund transfer date to process the fund transfer;
after the fund transfer, detecting, by the token management system of the mobile device, the expiration designation for the single token; and deleting, by the token management system of the mobile device, the single token based on the detected expiration designation by removing the single token from the token management system of the mobile device.

13. The computer-implemented method of claim 12, wherein the single token is a public token, wherein the public token includes one of an email address or a mobile phone number.

14. The computer-implemented method of claim 12, wherein the designated target for the funds transfer transaction is a designated account.

15. The computer-implemented method of claim 14, wherein the designated account is at least one of a checking account, a savings account, a home mortgage account, a home equity account, a student loan account, an online community account, an insurance account, or a fitness membership account.

16. The computer-implemented method of claim 12, wherein the designated target for the funds transfer transaction is a designated entity.

17. The computer-implemented method of claim 16, wherein the designated entity is at least one of a financial institution, a hospital, an insurance provider, or a fitness center.

18. The computer-implemented method of claim 12, further comprising:

receiving, by the token management system of the mobile device, a temporal restriction for the funds transfer transaction; and generating, by the token management system of the mobile device, a rule associating the single token, the temporal restriction for the funds transfer transaction, and the designated target for the funds transfer transaction.

19. The computer-implemented method of claim 18, wherein the temporal restriction for the funds transfer transaction comprises at least one of a date restriction, a non-business hours restriction, or a holiday restriction.

20. The computer-implemented method of claim 12, wherein the providing includes displaying, by the graphical user interface of the mobile device, the rule associating at least the single token, the transaction amount range for the amount of funds transferred in the funds transfer transaction, and the designated target for the funds transfer transaction.

* * * * *